Figure 1:
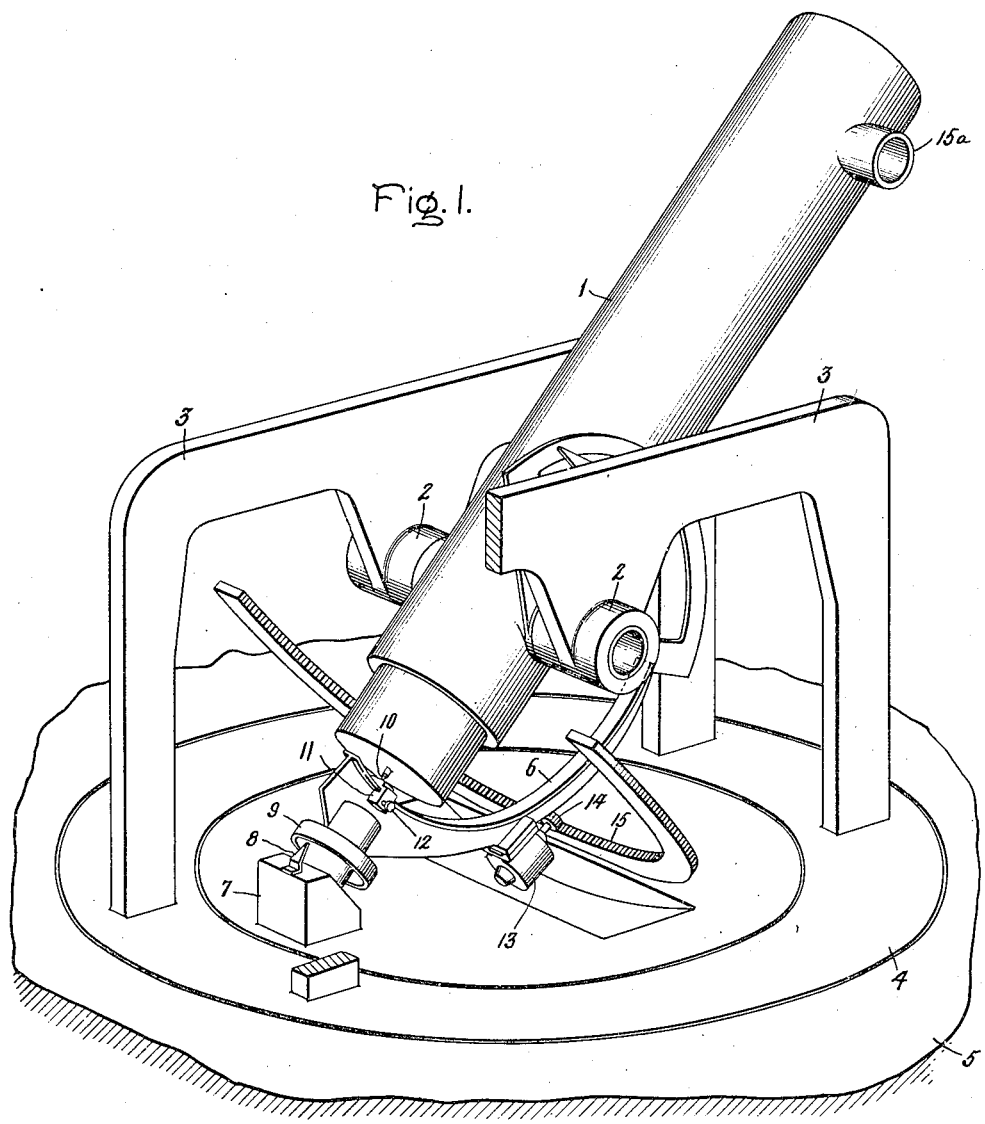

Aug. 10, 1943.  H. F. MORSE  2,326,552
ASTRONOMICAL TELESCOPE
Filed July 16, 1941   2 Sheets-Sheet 1

Inventor:
Harold F. Morse
by Harry E. Dunham
His Attorney.

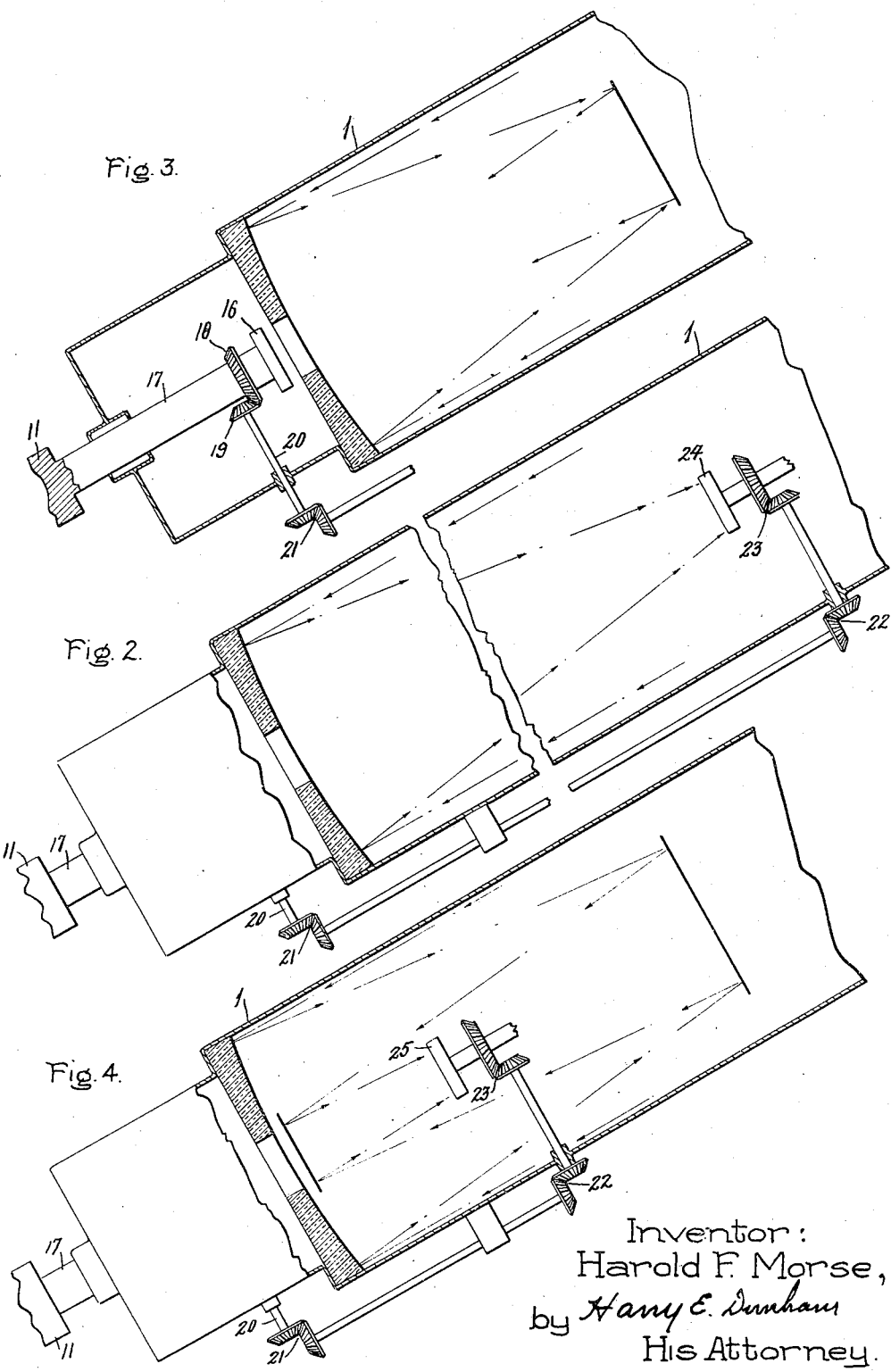

Patented Aug. 10, 1943

2,326,552

UNITED STATES PATENT OFFICE 2,326,552

ASTRONOMICAL TELESCOPE

Harold F. Morse, Southport, Conn., assignor to General Electric Company, a corporation of New York Application July 16, 1941, Serial No. 402,611

8 Claims. (Cl. 88—32)

The present invention relates to astronomical telescopes.

Due to the rotation of the earth about the polar axis, the stars, which are relatively fixed in space, have an apparent rotation about the earth. It is accordingly necessary, during observation, to change the sighting angle of the telescope so that it will remain trained on the stars being viewed. Heretofore astronomical telescopes have been supported by a mount known as the equatorial mount in which the telescope is supported in bearings on an axis passing through the north star and is kept trained on any particular star by rotation about this axis in a direction opposite the direction of the earth's rotation. In large sizes the equatorial mount has the practical disadvantage that the stresses in the supporting structure continually change with the position of the telescope so that the deflection of the supporting structure affects the position of the telescope.

The object of my invention is to provide an improved telescope mount which will overcome some of the disadvantages of the equatorial mount, and for a consideration of what I believe novel and my invention, attention is directed to the following description and the claims appended thereto.

In the accompanying drawings, Fig. 1 is a perspective view of a telescope embodying my invention, and Figs. 2, 3, and 4 are diagrammatic views showing arrangements for supporting photographic plate holders at the prime, secondary, and tertiary focuses.

Referring to the drawings, there is shown a telescope 1 supported for rotation about a horizontal axis passing through its center of gravity by hollow trunnions 2 carried in standards 3. The standards are supported for rotation about a vertical axis likewise passing through the center of gravity of the telescope by a ring 4 suitably supported by a thrust bearing in a base 5. Beneath the telescope is an azimuth circle 6 having its center at the intersection of the horizontal and vertical axes. The azimuth circle is supported for rotation about a diametral axis passing through the north star in a support 7 on the base 5. The support carries a pointer 8 which cooperates with a dial 9 on the azimuth circle to indicate its angular position. The position of the telescope is controlled by a pin 10 in line with the longitudinal or optical axis of the telescope which is seated in a bearing in a block 11. The block 11 is slidable along the azimuth circle and may be locked in any desired position, corresponding to the declination of the star being viewed, by a set screw 12. Upon rotation of the azimuth circle, the telescope is constrained by the pin 10 and block 11 to describe an arcuate path about the polar axis, i. e., the axis upon which the azimuth circle rotates. The movement of the telescope is a compound movement having as one component rotation of the telescope in the trunnions 2 and as the other component rotation of the supports 3 on the bearing supporting the ring 4. Accordingly the telescope will remain trained on any particular fixed star if the azimuth circle is rotated backward in a direction opposite the earth's rotation. This rotation of the azimuth circle obviously must be at the same rate as the earth's rotation. In the present construction the rotation of the azimuth circle is effected by means of a motor 13 carried by the azimuth circle and controlled by an astronomical clock. The motor rotates the azimuth circle by means of a pinion 14 on the motor shaft which meshes with a circular rack 15 supported on the base 5.

Since the trunnion support for the telescope passes through the center of gravity of the telescope, tilting of the telescope about its horizontal axis does not change the load on the bearings nor the stresses on the supporting standards. This means that the sighting of the telescope does not have to be corrected for deflection of the supporting structure.

While my telescope as described is suitable for visual work, during which the stars are viewed through an eye piece 15a at the prime focus some problems are introduced when the telescope is used for photographing. This is due to the fact that the telescope turns on its own axis during the rotation of the azimuth circle. In photographing at the secondary focus the plate holder 16 may be supported as shown in Fig. 3 in fixed relation to the azimuth circle on a standard 17 non-rotatably seated on the block 11 and journaled in the telescope. The standard 17 has the same function as the pin 10. When so supported the plate holder will remain in a fixed position relative to the stars. In photographing at the prime and tertiary focuses some arrangement is necessary to turn the plate holder so as to maintain the plate holder in fixed relation to the azimuth circle. This may be effected by a bevel gear 18 on the standard 17 which meshes with a bevel gear 19 on a shaft 20 journaled in the telescope. The shaft 20 accordingly turns in proportion to the turning of the telescope with reference to the azimuth circle. The rotation of the shaft 20 is transmitted through gears 21, 22, and 23 to plate holders 24 and 25 located at the prime and tertiary focuses as shown respectively in Figs. 2 and 4.

What I claim as new and desire to secure by Letters Patent of the United States is:

1. In an astronomical telescope, a carrier rotatable on a vertical axis, a telescope on the carrier supported thereon for rotation on a horizontal axis intersecting said vertical axis, an azimuth circle having its center at the intersection of said horizontal and vertical axes, means supporting the circle for rotation on a diametral axis, and means for constraining the line of sight of the telescope in fixed relation to a point on the circle whereby the telescope describes an arc about said diametral axis upon rotation of the circle.

2. In an astronomical telescope, a carrier rotatable on a vertical axis, a telescope on the carrier supported thereon for rotation on a horizontal axis intersecting said vertical axis, an azimuth circle having its center at the intersection of said horizontal and vertical axes, means supporting the circle for rotation on a diametral axis, and a guide member on the circle cooperating with the telescope to hold the angle of sight of the telescope in fixed relation to said member whereby the telescope describes an arc about said diametral axis upon rotation of the circle.

3. In an astronomical telescope, a carrier rotatable on a vertical axis, a telescope on the carrier supported thereon for rotation on a horizontal axis intersecting said vertical axis, an azimuth circle having its center at the intersection of said horizontal and vertical axes, means supporting the circle for rotation about a diametral axis, means for constraining the line of sight of the telescope in fixed relation to a point on the circle whereby the telescope describes an arc about said diametral axis upon rotation of the circle, and a plate holder supported in fixed relation to the circle.

4. In an astronomical telescope, a carrier rotatable on a vertical axis, a telescope on the carrier supported thereon for rotation on a horizontal axis intersecting said vertical axis, an azimuth circle having its center at the intersection of said horizontal and vertical axes, means supporting the circle for rotation about a diametral axis, means for constraining the line of sight of the telescope in fixed relation to a point on the circle whereby the telescope describes an arc about said diametral axis upon rotation of the circle, a plate holder rotatably supported on the telescope, and means responsive to rotation of the telescope about its optical axis relative to the circle for rotating the plate holder in a direction opposite to and an amount proportional to said relative rotation.

5. In an astronomical telescope, a telescope, a carrier therefor, provisions supporting the telescope on the carrier for rotation on a horizontal axis relative to the carrier and for supporting the carrier for rotation on a vertical axis whereby through rotation of the telescope and carrier on the respective axes the telescope may be kept trained on a star, a plate holder carried by the telescope, and provisions for supporting the plate holder for rotation relative to the telescope on the optical axis of the telescope whereby through rotation of the plate holder on its axis the rotation of the telescope on its optical axis relative to the rotation of the earth may be compensated for.

6. In an astronomical telescope, a carrier rotatable on a vertical axis, a telescope supported on the carrier for rotation on a horizontal axis intersecting said vertical axis, a control for keeping the telescope trained on a star including a member rotatable about a polar axis intersecting said axes, and provisions for maintaining in a plane including said polar axis a fixed relation between said member and the telescope.

7. In an astronomical telescope, a telescope, a carrier therefor, provisions supporting the telescope on the carrier for rotation on a horizontal axis relative to the carrier and for supporting the carrier for rotation on a vertical axis whereby through rotation of the telescope and carrier on the respective axes the telescope may be kept trained on a star, a plate holder carried by the telescope, provisions for supporting the plate holder for rotation relative to the telescope on the optical axis of the telescope, and a control responsive to rotation of the telescope on its optical axis relative to the rotation of the earth for rotating the plate holder in the reverse direction whereby the rotation of the telescope on its optical axis relative to the rotation of the earth may be compensated for.

8. In an astronomical telescope, a telescope, a carrier therefor, provisions supporting the telescope on the carrier for rotation on a horizontal axis relative to the carrier and for supporting the carrier for rotation on a vertical axis whereby through rotation of the telescope and carrier on the respective axes the telescope may be kept trained on a star, and a support for a plate holder in line with the optical axis of the telescope and rotatable about the polar axis, and means for rotating the plate holder support about the polar axis to compensate for the earth's rotation as the telescope is kept trained on a star by rotation about its axes.

HAROLD F. MORSE.